(12) United States Patent
Rivas Cortés et al.

(10) Patent No.: US 8,186,935 B2
(45) Date of Patent: May 29, 2012

(54) STEAM TURBINE HAVING EXHAUST ENTHALPIC CONDITION CONTROL AND RELATED METHOD

(75) Inventors: Flor Del Carmen Rivas Cortés, Clifton Park, NY (US); Nestor Hernandez, Schenectady, NY (US); Kurt Neal Laurer, Saratoga Springs, NY (US); William Thomas Parry, Rexford, NY (US)

(73) Assignee: General Electric Company, Schenectady, NY (US)

( * ) Notice: Subject to any disclaimer, the term of this patent is extended or adjusted under 35 U.S.C. 154(b) by 788 days.

(21) Appl. No.: 12/352,044

(22) Filed: Jan. 12, 2009

(65) Prior Publication Data
US 2010/0178156 A1 Jul. 15, 2010

(51) Int. Cl.
*F01B 25/00* (2006.01)
*F01D 17/00* (2006.01)
*F01D 19/00* (2006.01)
*F01D 21/00* (2006.01)
*F03B 15/00* (2006.01)
*F04D 27/00* (2006.01)

(52) U.S. Cl. ............................................. 415/13; 415/1
(58) Field of Classification Search .................... 415/13, 415/1
See application file for complete search history.

(56) References Cited

U.S. PATENT DOCUMENTS
4,403,476 A 9/1983 Johnson et al.

FOREIGN PATENT DOCUMENTS
| DE | 19720881 A1 | 11/1998 |
| FR | 2899936 A1 | 10/2007 |
| GB | 1062303 | * 3/1967 |
| GB | 1062303 A | 3/1967 |
| JP | 54065203 A | 5/1979 |
| JP | 2006207558 A | 8/2006 |

OTHER PUBLICATIONS

European Patent Application No. 10150264.9, European Search Report dated Jun. 11, 2010.

* cited by examiner

*Primary Examiner* — Stephen W Smoot
*Assistant Examiner* — Vicki B Booker
(74) *Attorney, Agent, or Firm* — Hoffman Warnick LLC; Ernest G. Cusick

(57) ABSTRACT

A steam turbine includes a casing including a steam inlet and an exhaust, the casing enclosing operative structure of the steam turbine; a valve controlling introduction of a steam flow at a location of the steam turbine to impact an enthalpic condition of steam exiting the exhaust; and a controller controlling operation of the valve to attain a desired enthalpic condition of steam exiting the exhaust. Controlling operation of the valve allows for attainment of a desired enthalpic condition of the steam exiting the exhaust for use in another industrial process without having to modify the steam turbine structure.

16 Claims, 2 Drawing Sheets

STEAM TURBINE HAVING EXHAUST ENTHALPIC CONDITION CONTROL AND RELATED METHOD

BACKGROUND OF THE INVENTION

The invention relates generally to turbine technology. More particularly, the invention relates to a steam turbine having exhaust enthalpic condition control and a related method.

Two types of steam turbines used in industry are a condensing steam turbine and a non-condensing steam turbine. A condensing steam turbine exhausts steam in a partly condensed state, while in a non-condensing steam turbine steam is pulled from various locations and used for other industrial applications such as preheating water boilers, etc. Valves may control steam extracted from a non-condensing steam turbine. Non-condensing steam turbines are typically used in industrial applications where there is a need to have steam at specific pressure and temperature conditions for other industrial applications. Extraction points can be located at any point in the steam path that provides the necessary steam conditions.

Steam for industrial applications can be obtained from turbine extractions or from the turbine exhaust. Steam condition requirements vary from one customer to the other. Consequently, each steam turbine may require specific modifications of the steam turbine structure to achieve the desired enthalpic conditions for the exhaust, which is cumbersome and expensive. Since there are only so many models of steam turbine that a manufacturer can reasonably produce, there may be instances where use of exhaust steam for other industrial applications may not be possible while still meeting other requirements for the steam turbine.

BRIEF DESCRIPTION OF THE INVENTION

A first aspect of the disclosure provides a steam turbine comprising: a casing including a steam inlet and an exhaust, the casing enclosing operative structure of the steam turbine; a valve controlling introduction of a steam flow at a location of the steam turbine to impact an enthalpic condition of steam exiting the exhaust; and a controller controlling operation of the valve to attain a desired enthalpic condition of steam exiting the exhaust.

A second aspect of the disclosure provides a method comprising: providing a steam turbine having a casing including a steam inlet and an exhaust, the casing enclosing operative structure of the steam turbine; and controlling operation of a valve that controls introduction of a steam flow at a location of the steam turbine that impacts an enthalpic condition of steam exiting the exhaust to attain a desired enthalpic condition of the steam exiting the exhaust.

DETAILED DESCRIPTION OF THE INVENTION

Figure 1:
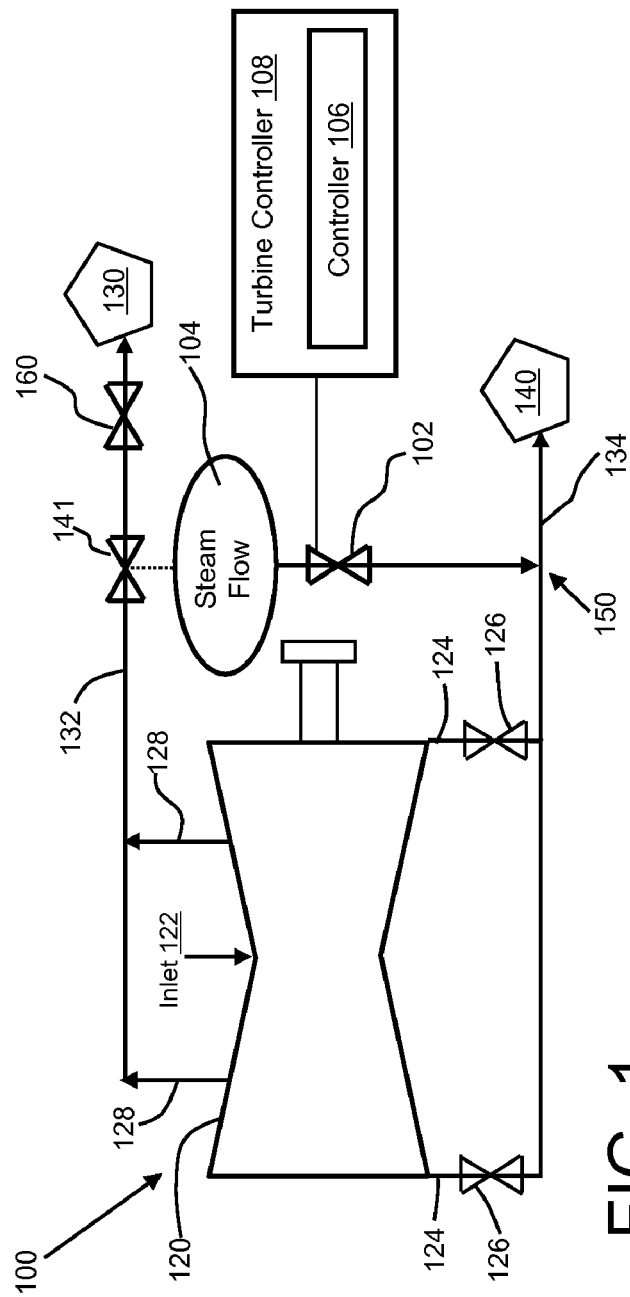
FIG. 1 shows a schematic block diagram illustrating embodiments of a steam turbine having exhaust enthalpic control.

Referring to the drawings, FIG. 1 shows a schematic block diagram illustrating embodiments of a steam turbine 100 having exhaust enthalpic control provided by a valve 102 that controls a steam flow 104, i.e., from a source of steam. Valve 102 operation is controlled via a controller 106. Controller 106 may be a stand alone controller, or it may be part of an overall steam turbine controller 108.

Steam turbine 100 may include any now known or later developed steam turbine that includes a casing 120 including a steam inlet 122 and an exhaust 124 (two shown). Steam turbine 100 is designed with a specific turbine efficiency to achieve either wet (percentage moisture) or dry (degrees of superheat) exhaust 124 conditions. As understood, casing 120 encloses operative structure of the steam turbine such as a rotor, rotating blades, vanes, etc., that are acted upon by steam entering through steam inlet 122. Exhaust(s) 124 allows egress of used steam from casing 120, and may each include appropriate control, isolation and relief valves 126 controlled by turbine controller 108 in a known fashion.

Steam turbine 100 may be a condensing type turbine, or as illustrated, may be of the non-condensing type, including at least one extraction point 128 at which steam is extracted from casing 120. Despite illustration of extraction point(s) 128 as on casing 120, they can be located at any point in the steam path. As understood, steam taken from extraction point(s) 128 may be used in another industrial application 130. Another industrial application 140 is also shown to which steam from exhaust 124 generated according to teachings of embodiments of the invention may be applied. Industrial applications 130 and 140 each may include any now known or later developed process that may use steam at the respective conditions provided from extraction point(s) 128 for industrial application 130 and from exhaust 124 for industrial application 140. (Note that the industrial application 130 to which extracted steam is delivered, where extraction point(s) 128 are provided, may be different than that (140) to which steam from exhaust 124 is delivered, and may require steam having different enthalpic conditions). A non-exhaustive list of industrial applications may include a de-salination process, district heating, a lower pressure turbine, a boiler, etc. Appropriate conduit(s) 132, 134 may be provided for delivering the steam exiting extraction point(s) 128 and/or exhaust 124 to industrial application 130, 140, respectively.

Valve 102 controls introduction of steam flow 104 at a location 150 of steam turbine 100 to impact enthalpic conditions of steam exiting exhaust(s) 124. Conventionally, in order for steam exiting through exhaust 124 to be applied to another industrial application 140, a steam turbine needed to be designed to provide the particular enthalpic conditions at the exhaust. Consequently, each application of the steam turbine required specific modifications of the steam turbine structure to achieve the desired enthalpic conditions, which is cumbersome and expensive. In accordance with embodiments of the invention, however, controller 106 controls operation of valve 102 to attain a desired enthalpic condition of steam exiting exhaust(s) 124. Different industrial applications 140 can thus be provided with steam from exhaust 124 of steam turbine 100 without modifying the structure of steam turbine 100.

Steam flow 104 can be originated in a number of ways. In FIG. 1, steam flow 104 may be originated from an extraction point 128 (via dashed conduit)where steam turbine includes them. In this case, extraction of steam may be controlled by a valve 141. However, steam flow 104 may be generated from any other source, e.g., another boiler separate from that for steam turbine 100.

Figure 2:
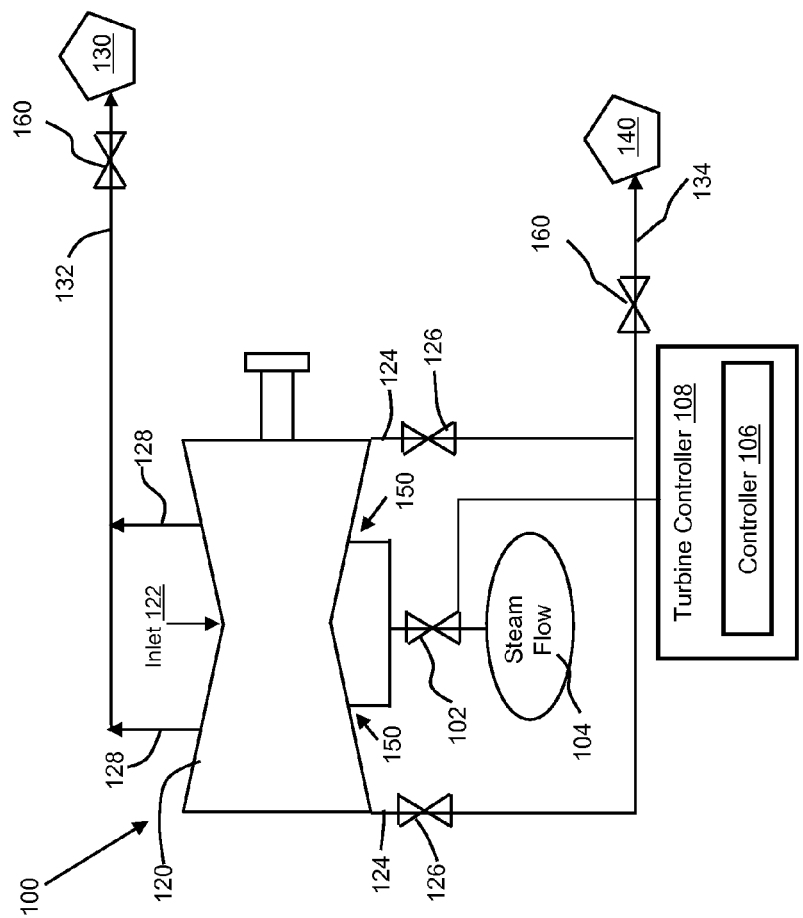
FIG. 2 shows a schematic block diagram illustrating alternative embodiments of a steam turbine having exhaust enthalpic control.

As shown in the figures, location 150 at which steam flow 104 is introduced to the steam path of steam turbine 100 may vary. In one embodiment, shown in FIG. 1, the location of introduction of steam flow 104 is positioned at exhaust 124 (i.e., at exhaust 124 or a position directly downstream therefrom). Alternatively, as shown in FIG. 2, location 150 may be positioned at a point along casing 120. That is, steam flow 104 is introduced into the operative structure of steam turbine 100 such as at a particular stage of rotating blade (not shown). Although location 150 in FIG. 2 is shown as two points, it is understood that the location may include only one entry point. Further, although two example locations have been illustrated, it is understood that location 150 could be at different positions than that shown along the steam path.

In operation, steam turbine 100 is provided and operation of valve 102 that controls introduction of steam flow 104 at a location of the steam turbine that impacts an enthalpic condition of steam exiting the exhaust is controlled to attain a desired enthalpic condition of the steam exiting the exhaust. That is, steam flow 104 has the appropriate fundamental enthalpic conditions such that when an appropriate volume of steam flow 104 is combined with whatever steam exists at location 150 at which it is introduced into the steam path of steam turbine 100, it results in steam at exhaust 124 having a desired enthalpic condition for an industrial application 140. Controller 106 may access appropriate, well-known sensors for determining the enthalpic conditions of steam flow 104 and the steam at exhaust 124. Controller 106 may further include appropriate logic for comparison of enthalpic conditions of steam at exhaust 124 and steam flow 104 and for calculating appropriate volumes of steam flow 104 to introduce into location 150 to achieve the desired enthalpic conditions for the exhaust steam. The logic required is considered well within the purview of one with ordinary skill in the art to program, and will not be described further.

In an optional embodiment, a throttling valve 160 may also be positioned downstream from extraction point(s) 128 and/or exhaust 124 to increase the exhaust enthalpy by increasing exhaust pressure (shorten the expansion line).

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steam turbine comprising:
   a casing including a steam inlet and an exhaust, the casing enclosing operative structure of the steam turbine,
   wherein the steam inlet is adapted to introduce an operative steam flow in to the casing and the exhaust is adapted to enable a portion of the operative steam flow to exit the casing;
   a valve controlling introduction of a control steam flow at a location of the steam turbine, the control steam flow impacting an enthalpic condition of the portion of the operative steam flow exiting the casing via the exhaust; and
   a controller controlling operation of the valve to attain a desired enthalpic condition of the portion of the operative steam flow exiting the casing via the exhaust,
   wherein the controller is adapted to adjust a position of the valve based on the enthalpy of the portion of the operative steam flow exiting the casing via the exhaust.

2. The steam turbine of claim 1, wherein the location is positioned at the exhaust.

3. The steam turbine of claim 1, wherein the location is positioned at a point along the casing.

4. The steam turbine of claim 1, further comprising at least one extraction point at which steam is extracted from the casing.

5. The steam turbine of claim 4, wherein the control steam flow is originated from the at least one extraction point.

6. The steam turbine of claim 1, wherein the controller is part of a controller for the steam turbine.

7. The steam turbine of claim 1, further comprising a conduit for delivering the portion of the operative steam flow exiting the casing via the exhaust to an industrial application.

8. The steam turbine of claim 1, further comprising a throttling valve downstream from the exhaust.

9. A method comprising:
   providing a steam turbine having a casing including a steam inlet and an exhaust, the casing enclosing operative structure of the steam turbine,
   wherein the steam inlet is adapted to introduce an operative steam flow in to the casing and the exhaust is adapted to enable a portion of the operative steam flow to exit the casing; and
   controlling operation of a valve that controls introduction of a control steam flow at a location of the steam turbine that impacts an enthalpic condition of the portion of the operative steam flow exiting the casing,
   wherein the valve is adjusted to attain a desired enthalpic condition of the portion of the operative steam flow exiting the casing.

10. The method of claim 9, wherein the location is positioned at the exhaust.

11. The method of claim 9, wherein the location is positioned at a point along the casing.

12. The method of claim 9, further comprising extracting steam from at least one extraction point from the casing.

13. The method of claim 12, wherein the control steam flow is originated from the at least one extraction point.

14. The method of claim 9, wherein the controlling is performed by a controller for the steam turbine.

15. The method of claim 9, further comprising delivering the portion of the operative steam flow exiting the casing via the exhaust to an industrial application.

16. The method of claim 9, further comprising providing a throttling valve downstream from the exhaust.

* * * * *